(12) United States Patent
Itoh et al.

(10) Patent No.: US 8,395,975 B1
(45) Date of Patent: Mar. 12, 2013

(54) OPTICAL READ/WRITE APPARATUS

(75) Inventors: Noboru Itoh, Osaka (JP); Kazuo Momoo, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/542,138

(22) Filed: Jul. 5, 2012

(30) Foreign Application Priority Data

Sep. 27, 2011 (JP) .................................. 2011-210371

(51) Int. Cl.
*G11B 7/00* (2006.01)

(52) U.S. Cl. ............... 369/44.14; 369/44.11; 369/44.37; 369/93

(58) Field of Classification Search ............... 369/44.11, 369/44.14, 44.37, 93, 112.01, 112.23
See application file for complete search history.

(56) References Cited

U.S. PATENT DOCUMENTS

| | | | | |
|---|---|---|---|---|
| 4,460,988 A * | 7/1984 | Gordon | ...................... | 369/30.04 |
| 4,845,696 A * | 7/1989 | Ohtsuki et al. | ............. | 369/13.28 |
| 4,998,238 A * | 3/1991 | Mizunoe et al. | ............. | 369/116 |
| 5,465,244 A * | 11/1995 | Kobayashi et al. | .......... | 369/47.4 |
| 5,737,282 A * | 4/1998 | Shimonou | ................. | 369/30.14 |
| 7,460,442 B2 * | 12/2008 | Nagatomo | ................. | 369/30.03 |
| 2005/0162990 A1 * | 7/2005 | Murata | ...................... | 369/30.23 |
| 2006/0044337 A1 | 3/2006 | Takata | | |
| 2006/0198264 A1 * | 9/2006 | Ueno et al. | ................. | 369/53.22 |
| 2009/0316556 A1 * | 12/2009 | Suzuki | ...................... | 369/53.42 |
| 2011/0242953 A1 * | 10/2011 | Mahnad | ................... | 369/53.11 |
| 2011/0242958 A1 * | 10/2011 | Shi et al. | ....................... | 369/103 |

FOREIGN PATENT DOCUMENTS

| JP | 63-096747 A | 4/1988 |
|---|---|---|
| JP | 2004-054983 A | 2/2004 |
| JP | 2006-286070 A | 10/2006 |

\* cited by examiner

*Primary Examiner* — Daniell L Negron
*Assistant Examiner* — Brenda Bernardi
(74) *Attorney, Agent, or Firm* — Renner, Otto, Boisselle & Sklar, LLP

(57) ABSTRACT

In one embodiment, an optical read/write apparatus includes first and second optical pickups 2*a*, 2*b* and a control section. The first optical pickup 2*a* includes a first lens 3*a* that condenses a light beam emitted from a first light source onto an optical storage medium, and a first lens actuator that can shift the first lens 3*a* in a track crossing section with respect to a middle position. The second optical pickup 2*b* includes a second lens 3*b* that condenses a light beam emitted from a second light source onto the optical storage medium, and a second lens actuator that can shift the second lens 3*b* in the track crossing section with respect to the middle position. The control section makes the lens actuators operate so that as the magnitude of shift of the first lens 3*a* increases, that of the second lens 3*b* decreases.

10 Claims, 12 Drawing Sheets

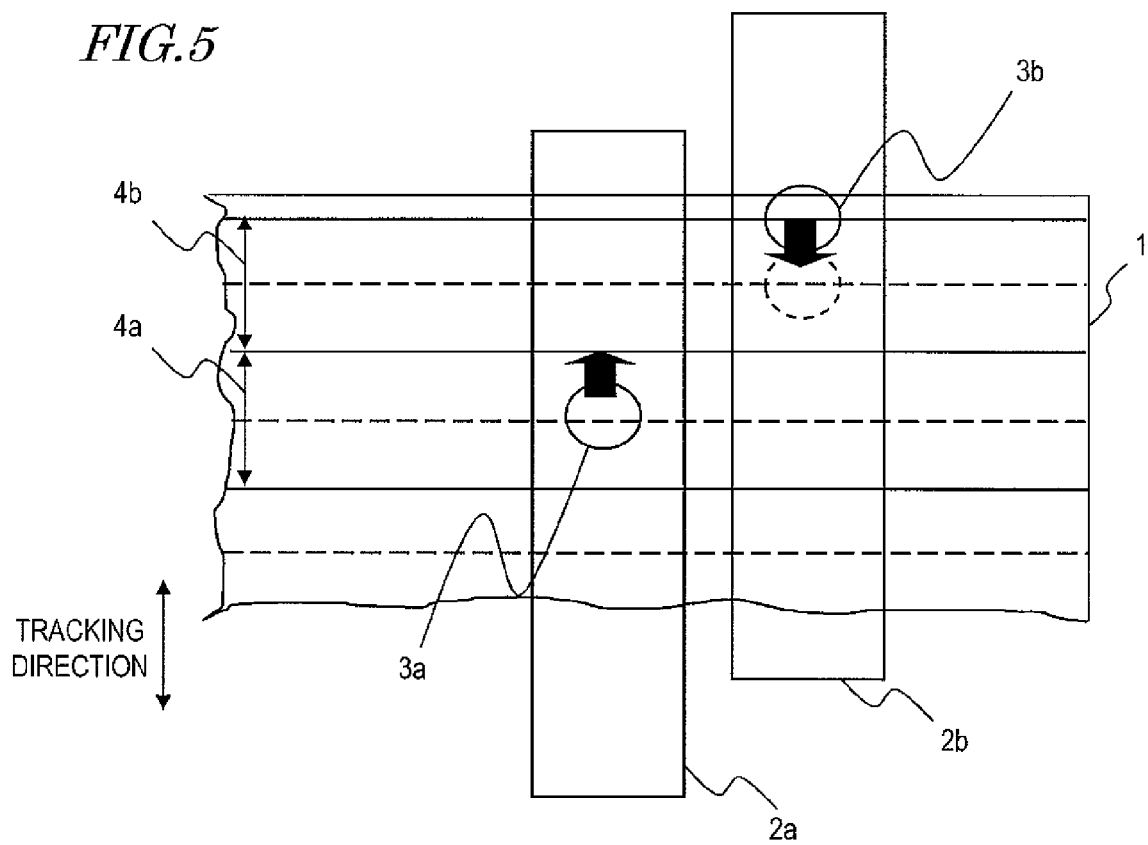

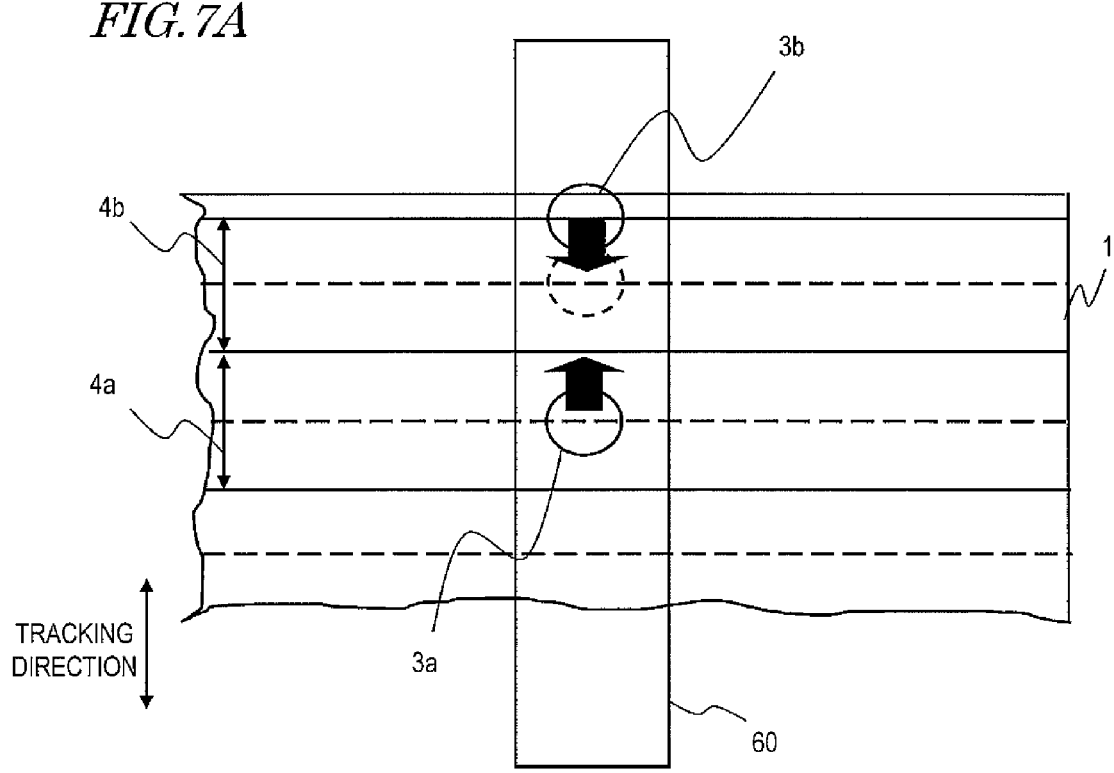

OPTICAL READ/WRITE APPARATUS

BACKGROUND OF THE INVENTION

1. Field of the Invention

The present disclosure relates to an optical read/write apparatus that reads, writes or erases information from/on an optical storage medium such as an optical tape, an optical disc or an optical card. More particularly, the present disclosure relates to an apparatus that carries out read/write operations in parallel with each other using multiple optical pickups.

2. Description of the Related Art

Recently, the size of digital data that can be stored on a storage medium has been rising steeply year by year as the resolutions of video data and still picture data have been tremendously increased and as increasing numbers of paper media have been converted into electronic ones. Meanwhile, so-called "crowd computing" technologies that allow people to use various kinds of applications and services via servers and storage systems on some network have become more and more popular nowadays. According to such crowd computing technologies, as a huge number of users save various kinds of data on that storage system on the network, the amount of data accumulated there should keep on skyrocketing from now on.

In the meantime, as regulations have been established one after another with regard to the duty of preserving such a huge amount of data saved, it should also be increasingly important to devise a method for saving that enormous amount of data as securely and as reliably as possible.

Japanese Laid-Open Patent Publication No. 2004-54983 (which will be referred to herein as "Patent Document No. 1" for convenience sake) discloses a configuration for increasing the data transfer rate at which a read/write operation is performed optically by an apparatus on an optical storage medium. The apparatus disclosed in Patent Document No. 1 arranges multiple optical pickups with respect to a given optical storage medium and performs read/write operations in parallel with each other using those optical pickups simultaneously. In order to increase the data transfer rate, the number of those optical pickups arranged needs to be large enough to cover every track of the optical storage medium.

Hereinafter, an example of an apparatus as disclosed in Japanese Laid-Open Patent Publication No. 2004-54983 will be described with reference to FIG. 9. In this example, the apparatus is supposed to be able to perform read/write operations simultaneously using three optical pickups 2. The relative positions of the optical pickups 2 with respect to the optical tape 1 are fixed. Each of those optical pickups 2 includes an objective lens 3 and a lens actuator that drives the objective lens 3. The lens actuator can shift the objective lens 3 in a track crossing direction (i.e., in a tracking direction). Although the optical pickups 2 are fixed, their objective lens 3 does shift. In this manner, each of those optical pickups 2 can cover a plurality of tracks included in an area with a width Wr. Each optical pickup 2 can follow, and can read and write data from/on, any track falling within its own range.

In the following description, the "track crossing direction" will be sometimes referred to herein as a "tracking direction" and the magnitude of shift of the objective lens 3 in the tracking direction for the purpose of performing a tracking operation will be referred to herein as the "magnitude of lens shift".

Supposing the number of optical pickups 2 arranged is twelve, the trackable range in which each of those optical pickups 2 can perform a read/write operation by shifting its own objective lens is Wr, and the overall track range of the optical tape 1 is W, the read/write operations can be performed on every track on the optical tape 1 if $$W = 12 \times Wr$$

is satisfied.

By performing read/write operations simultaneously using those twelve optical pickups 2, a high data transfer rate can be obtained.

However, each optical pickup includes a light source and lens actuator that dissipates power and generates heat. That is why if the number of optical pickups provided for an optical read/write apparatus increases, then the power dissipation and the quantity of the heat generated will both increase.

According to an embodiment of the present disclosure, when read/write operations are performed simultaneously using multiple optical pickups, the power dissipated and the heat generated can be reduced.

SUMMARY OF THE INVENTION

An optical read/write apparatus as an embodiment of the present disclosure includes: a plurality of optical pickups, including a first optical pickup and a second optical pickup, which are arranged so as to irradiate mutually different tracks of an optical storage medium with a light beam; and a control section which controls those optical pickups. The first optical pickup includes a first light source, a first objective lens that condenses a light beam that has been emitted from the first light source onto the optical storage medium, and a first lens actuator that is able to shift the first objective lens in a track crossing section with respect to a middle position. The second optical pickup includes a second light source, a second objective lens that condenses a light beam that has been emitted from the second light source onto the optical storage medium, and a second lens actuator that is able to shift the second objective lens in the track crossing section with respect to the middle position. The control section makes the first and second lens actuators operate so that as the magnitude of shift of the first objective lens increases in the first optical pickup, the magnitude of shift of the second objective lens decreases in the second optical pickup.

In one embodiment, the respective positions of the plurality of optical pickups are fixed perpendicularly to a track direction of the optical storage medium.

In another embodiment, the control section makes the first and second lens actuators operate so that the sum of the respective magnitudes of shift of the first and second objective lenses in the first and second optical pickups becomes constant.

In still another embodiment, the number of the optical pickups arranged, including the first and second optical pickups, is K, which is an integer that is equal to or greater than three. Each said optical pickup includes a light source, an objective lens that condenses a light beam that has been emitted from the light source onto the optical storage medium, and a lens actuator that is able to shift the objective lens in the track crossing section with respect to the middle position. The control section makes the lens actuators operate in the K optical pickups so as to make constant the sum of the respective magnitudes of shift of the objective lenses in the K optical pickups.

In yet another embodiment, the control section controls the first and second optical pickups so that the first optical pickup starts performing a read/write operation at around the middle of its allocated track range and that the second optical pickup starts performing a read/write operation at one end of its allocated track range.

In yet another embodiment, the first and second optical pickups are housed in the same housing.

In yet another embodiment, the control section arranges the respective objective lenses at their initial positions, which are associated with respective positions on tracks where the optical pickups start performing read/write operations, during a startup process.

In yet another embodiment, the control section changes the relative positions of the optical pickups with respect to the optical storage medium so that the neutral position of the objective lens of each said optical pickup is substantially on the centerline of its allocated track range.

In yet another embodiment, the control section determines, by reference to information that has been stored in advance in a startup area of the optical storage medium, the initial positions of the objective lenses when read/write operations are started.

In a specific embodiment, the optical storage medium is an optical tape, and the startup area is provided for at least one of the two ends of the optical tape.

Embodiments of the present disclosure provide an optical read/write apparatus that can reduce the power dissipated and the heat generated.

Other features, elements, processes, steps, characteristics and advantages of the present disclosure will become more apparent from the following detailed description of embodiments of the present disclosure with reference to the attached drawings.

BRIEF DESCRIPTION OF THE DRAWINGS

FIG. 5 is a plan view illustrating how optical pickups 2a and 2b make a lens shift in the first embodiment of the present disclosure.

Figure 6:
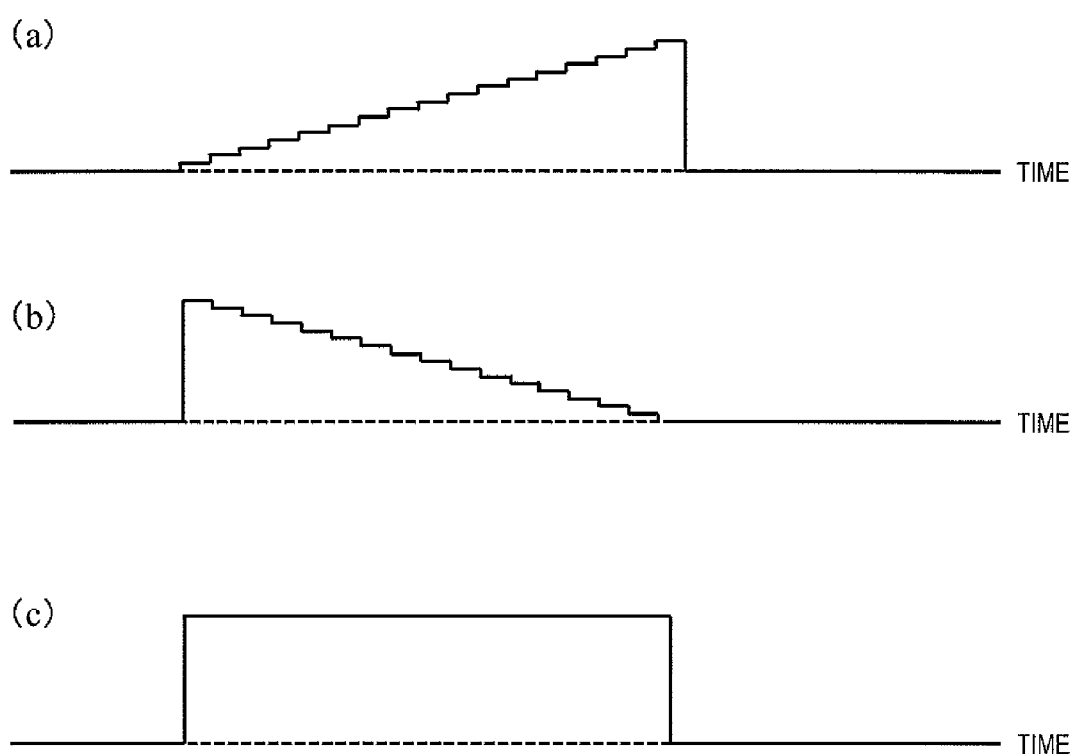

Portion (a) of FIG. 6 schematically shows how the power dissipated by the first optical pickup 2a changes with time, portion (b) of FIG. 6 schematically shows how the power dissipated by the second optical pickup 2b changes with time, and portion (c) of FIG. 6 is a graph showing how the sum of the powers dissipated by the first and second optical pickups 2a and 2b changes with time.

FIG. 7A is a plan view illustrating how optical pickups 2a and 2b make a lens shift in a second embodiment of the present disclosure.

Figure 7B:
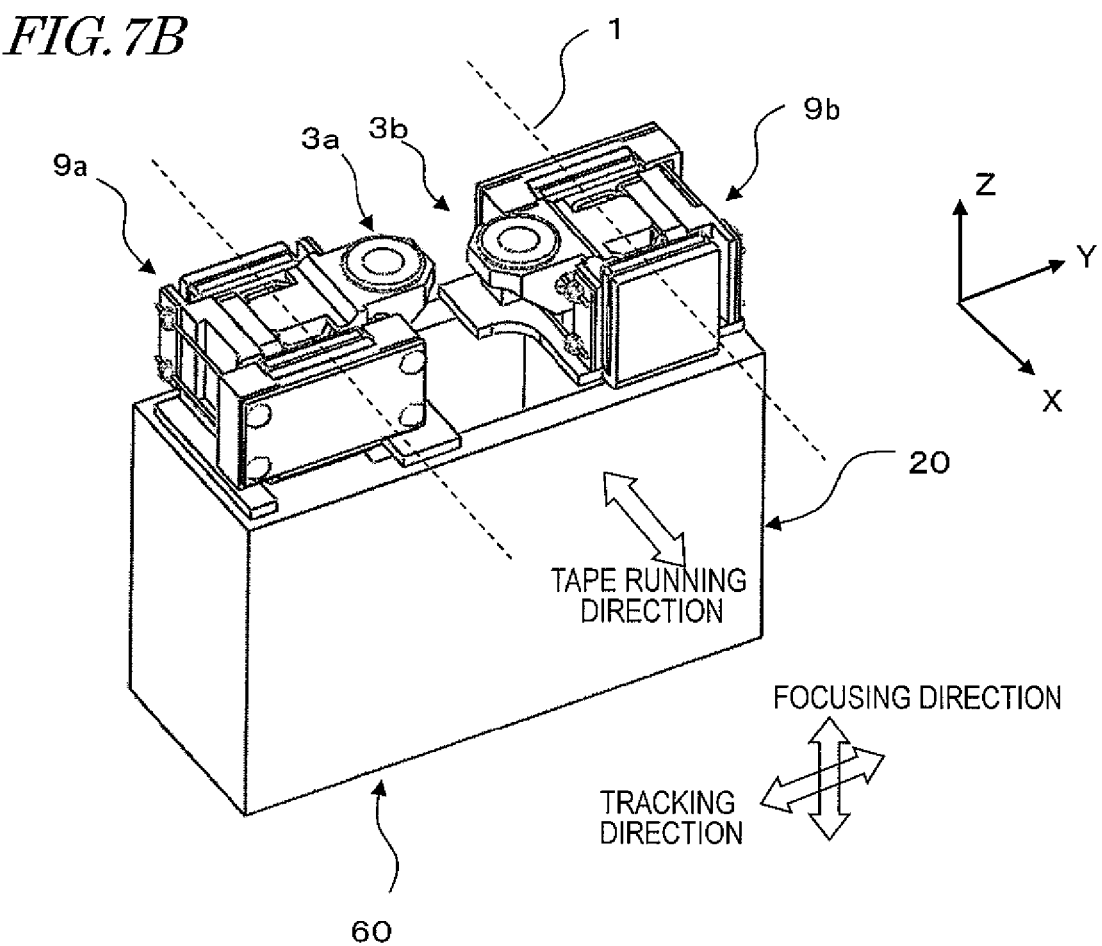

FIG. 7B is a perspective view illustrating optical pickup parts that may be used in the second embodiment of the present disclosure.

Figure 8A:
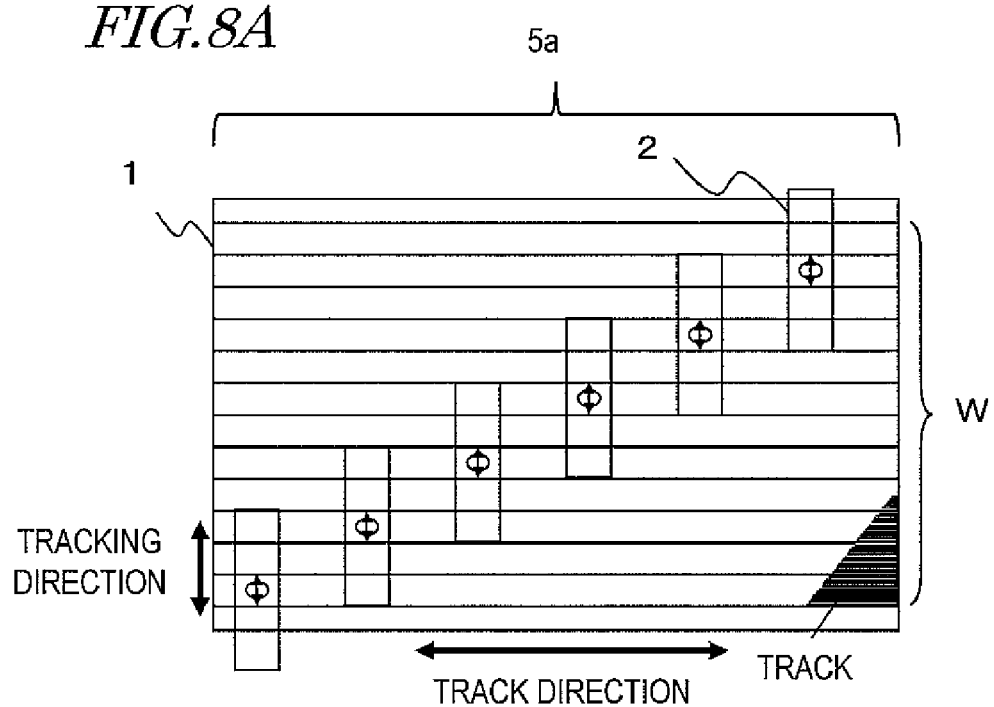

FIG. 8A is a plan view illustrating an exemplary arrangement of optical pickups 2 according to a third embodiment of the present disclosure.

Figure 8B:
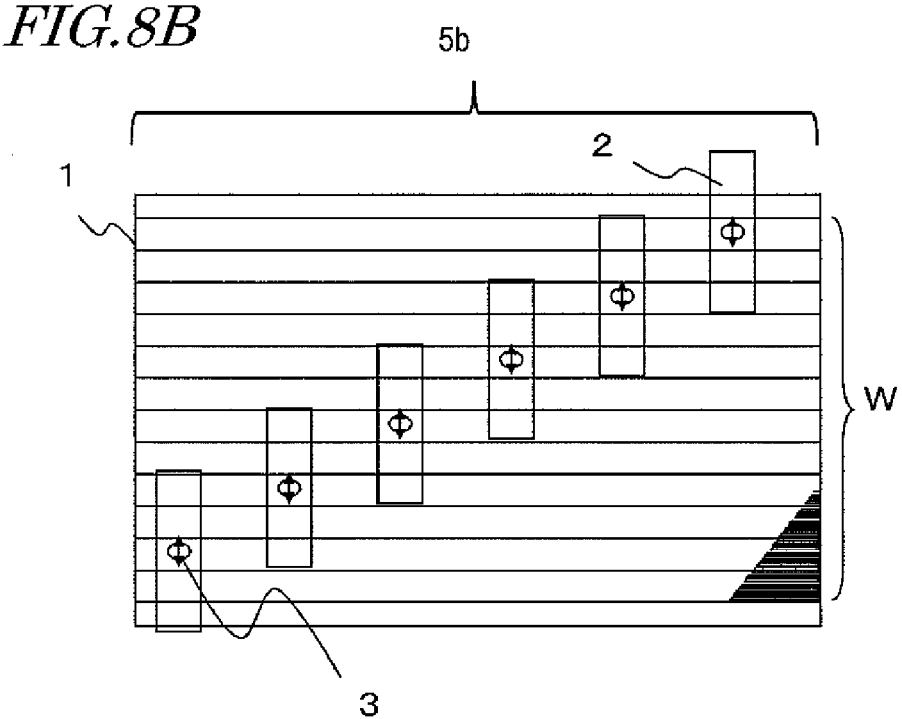

FIG. 8B is a plan view illustrating an exemplary arrangement of optical pickups 2 according to a third embodiment of the present disclosure.

Figure 9:
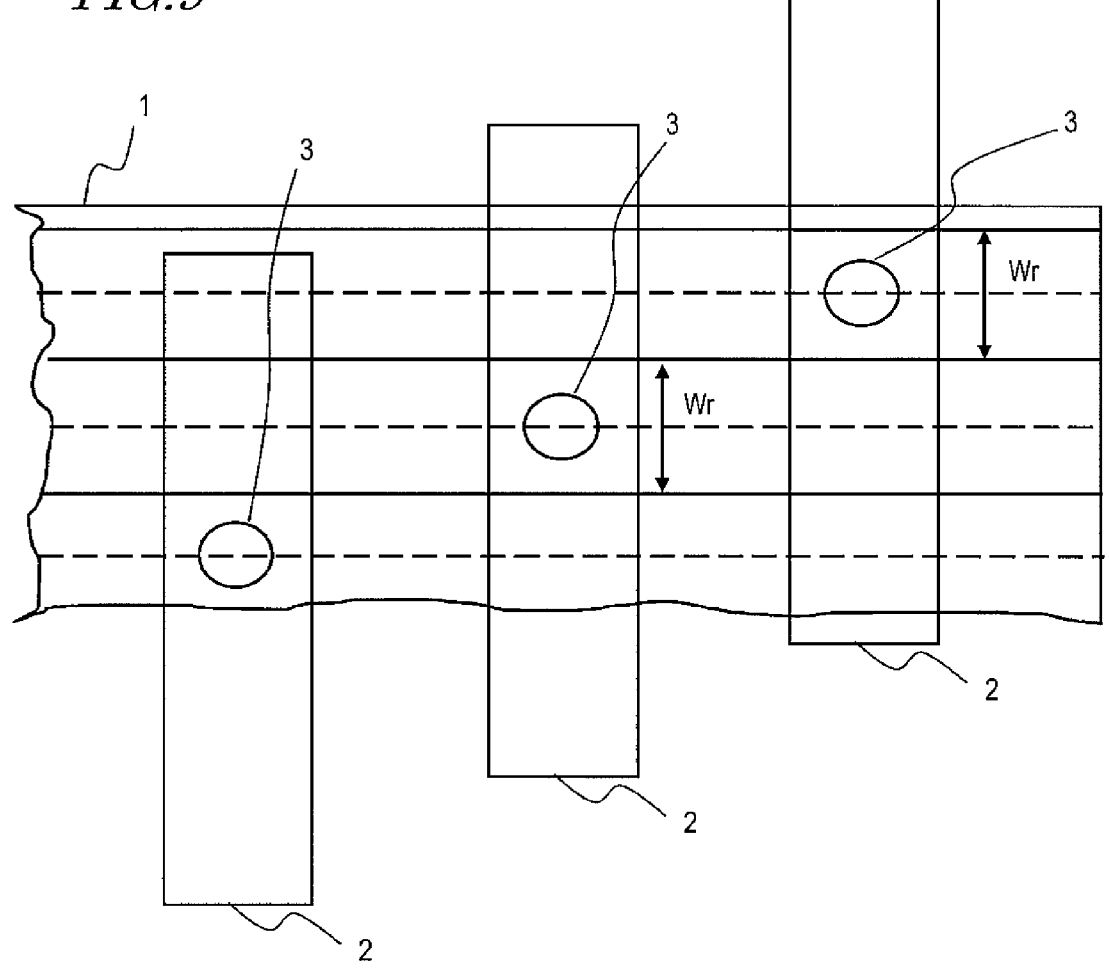

FIG. 9 is a plan view illustrating an exemplary arrangement of optical pickups 2 in a known apparatus.

Figure 10A:
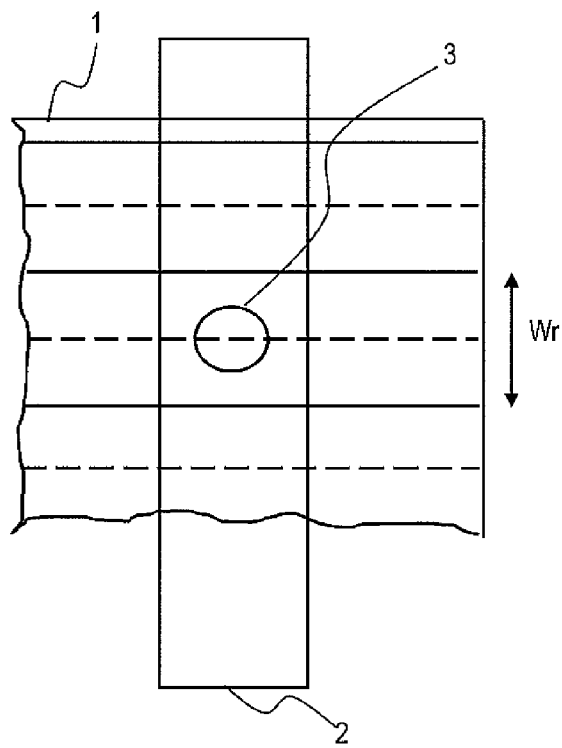

FIG. 10A is a plan view illustrating an objective lens 3 that is located at a neutral position in a known optical pickup 2.

Figure 10B:
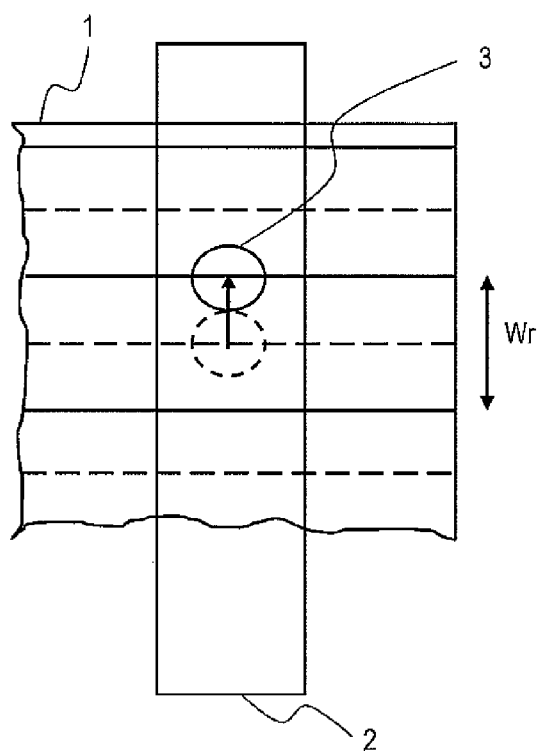

FIG. 10B is a plan view illustrating the objective lens 3 that has shifted from the neutral position in the known optical pickup 2.

DETAILED DESCRIPTION OF EMBODIMENTS

In the apparatus shown in FIG. 9, each optical pickup 2 drives its objective lens 3 in the tracking direction, thereby following the tracks on the optical tape 1. To drive the objective lens 3 in the tracking direction, the objective lens 3 is attached to a lens actuator, which has a voice coil arrangement including a coil and a magnet and which generates driving force by making current flow through its coil.

In the lens actuator, the objective lens 3 of each optical pickup 2 is supported by an elastic wire, a flat spring or a magnetic spring with respect to the tracking direction of the optical pickup 2 and held at a neutral position. The tracking operation can get done in roughly two major steps if the tracking operation on tracks on the optical tape 1 needs to be started in such a state. One of the two steps is DC correction, in which the lens is shifted by only the magnitude of the difference between the neutral position of the objective lens 3 and the average track position of the track to follow (i.e., the target track). The other step is AC correction, in which the lens is shifted by only the magnitude of AC displacement due to the deformation of the optical tape 1 when tracks are formed on it or eccentricity in the case of an optical disc. The magnitude of the lens shift is the sum of DC correction and AC correction.

FIGS. 10A and 10B are plan views schematically illustrating two different states of the same optical pickup. The optical tape 1 has a lot of tracks that run horizontally on the paper. Specifically, FIG. 10A illustrates how a read/write operation is performed on a track that is located around the neutral position of the objective lens 3. On the other hand, FIG. 10B illustrates how a read/write operation is performed on around the upper end of the track that is located most distant from the neutral position of the objective lens 3 within the tracking range.

As shown in FIG. 10A, when the target track of the read/write operation is located right under the neutral position of the objective lens 3, there is no need to drive the objective lens in order to make the DC correction. Therefore, in that case, the amount of current to be supplied to the coil of the lens actuator to make the DC correction becomes zero, so do the amount of current dissipated and the quantity of the heat generated. Even so, when the optical tape 1 turns or runs, the target track will still be displaced vertically on the paper. That is why some current will be dissipated and some heat will be generated as a result of operations other than the DC correction.

On the other hand, if the target track of the read/write operation is most distant from the neutral position of the objective lens 3 within the tracking range as shown in FIG. 10B, a maximum amount of current needs to be supplied to the coil of the lens actuator to make DC correction. In the following description, the amount of current supplied to the coil to make the DC correction is supposed to be identified by Imax per optical pickup and the quantity of heat generated in such a situation is supposed to be identified by Hmax. If multiple optical pickups start performing read/write operations on a track that is located around the neutral position of the objective lens at the same time and continue the read/write operations through the most distant track simultaneously as in the known apparatus, then the overall amount of current dissipated and the overall quantity of heat generated by those twelve optical pickups combined should be approximately equal to zero when the DC correction is made at the beginning of the write operation. On the other hand, when the multiple optical pickups perform read/write operations on the most distant track, the overall amount of current dissipated and the overall quantity of heat generated by those twelve optical pickups combined should be 12 Imax and 12 Hmax, respectively. That is to say, in that case, the optical read/write apparatus should cope with the maximum amount of current dissipated and the maximum quantity of heat generated. As a result, the optical read/write apparatus should dissipate a lot of current (or power) and should generate a lot of heat.

According to embodiments of the present disclosure to be described later, however, the respective optical pickups will cause the maximum magnitudes of lens shift at respectively different timings, and therefore, the maximum power dissipated by the optical read/write apparatus can be cut down.

Embodiment 1

First of all, an overall arrangement for an optical read/write apparatus as a first embodiment of the present disclosure will be described.

An optical read/write apparatus as the first embodiment of the present disclosure is an optical data streamer apparatus that uses an optical tape as an optical storage medium. Such an optical data streamer apparatus may be used to back up a huge quantity of data. In order to back up such an enormous quantity of data in a short time with the transfer rate increased, the optical data streamer apparatus includes a lot of optical pickups. It should be noted that the optical read/write apparatus of the present disclosure does not have to be an optical data streamer apparatus but may also be an optical disc apparatus or any other kind of apparatus. In the case of an optical disc apparatus, the optical storage medium is not an optical tape but an optical disc.

Figure 1A:
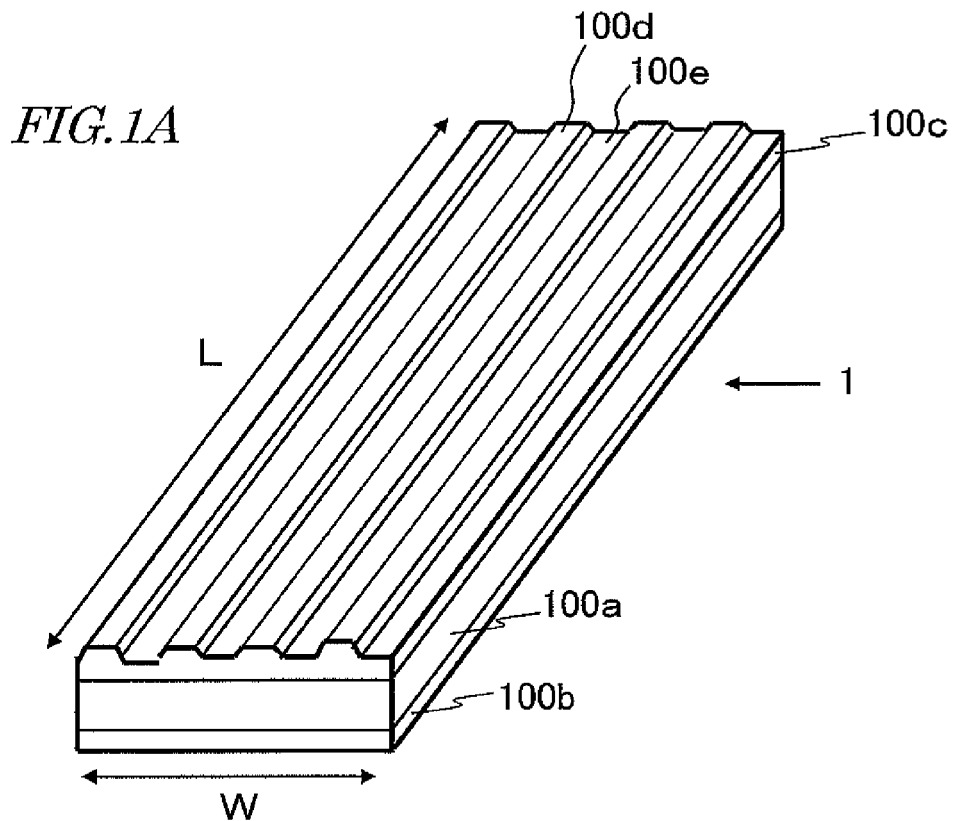
FIG. 1A is a perspective view schematically illustrating a portion of an optical tape 1 on a larger scale.

FIG. 1A is a perspective view schematically illustrating a portion of an optical tape 1 on a larger scale. The optical tape 1 may include a base film 100a, a back coating layer 100b that is adhered to the back surface of the base film 100a, and an imprint layer 100c that is supported by the base film 100a. On the upper surface of the imprint layer 100c, lands 100d and grooves 100e have been formed. Although not shown in FIG. 1A, a reflective film and a recording material film are deposited over the entire upper surface of the imprint layer 100c. The optical tape 1 is extended in the longitudinal direction L and may have a length of several hundred meters, for example. Its width W may be set within the range of a few millimeters to several centimeters, and its thickness may be within the range of a few micrometers to several ten micrometers.

It should be noted that FIG. 1A illustrating the optical tape 1 is not to scale. Actually, the optical tape 1 may have several hundreds, or an even greater number, of lands 100d and grooves 100e. In one embodiment, data is written on either the lands 100d or the grooves 100e. The lands 100d or the grooves 100e on which data is written will be referred to herein as "tracks", which may have a pitch of 0.2 μm to 0.4 μm, for example.

Figure 1B:
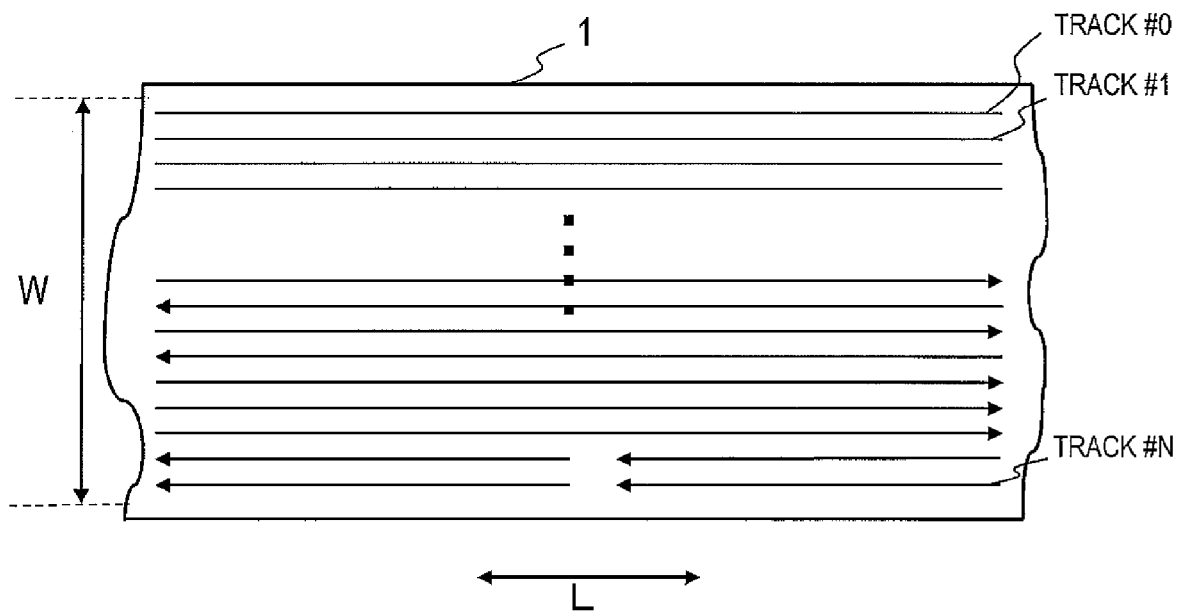
FIG. 1B is a plan view schematically illustrating a portion of the optical tape 1.

FIG. 1B is a plan view schematically illustrating a portion of the optical tape 1. As shown in FIG. 1B, N (which is an integer that is typically equal to or greater than 100) tracks #0 through #N have been formed to run in the longitudinal direction L. Some of those tracks illustrated in FIG. 1B are illustrated with an arrow. Each of those arrows indicates the direction in which data is written. That is to say, data can be written in multiple different directions on a single optical tape 1.

On the optical tape 1, a mark can be recorded optically by irradiating the tape 1 with a light beam. More specifically, such a mark is recorded on its recording material film. The light beam is radiated by an "optical pickup" that includes a light source and an objective lens that focuses the light beam emitted from the light source on the optical tape 1. When the optical pickup irradiates the optical tape 1 with a light beam, the irradiated portion of the optical tape 1 comes to have a different optical property such as a reflectance from the rest (i.e., the non-irradiated portion) of the optical tape 1. Such a portion, of which the optical property has changed in this manner, is called a "recorded mark".

In optical tape technologies, data can be read out from the optical tape 1 by irradiating the tape 1 with a relatively weak light beam with a constant intensity and detecting the light that has been modulated by, and reflected from, the optical tape 1. In writing data on the optical tape 1, data is written there by irradiating the optical tape 1 with a pulsed light beam, of which the optical power has been changed according to the data to be written, and locally changing the property of the recording material film.

When data is going to be written on the recording material film, the recording material film is irradiated with such a light beam, of which the optical power has been modulated as described above, thereby recording an amorphous mark on a crystalline recording material film. Such an amorphous recorded mark is left there by heating a portion of the recording material film that has been irradiated with a writing light beam to a temperature that is equal to or higher than its melting point and then rapidly cooling that portion. If the optical power of a light beam that irradiates the recorded mark is set to be relatively low, the temperature of the recorded mark being irradiated with the light beam does not exceed its melting point and the recorded mark will turn crystalline again after having been cooled rapidly (i.e., the recorded mark will be erased). In this manner, the recorded mark can be rewritten over and over again. However, if the power of the light beam for writing data had an inappropriate level, then the recorded mark would have a deformed shape and sometimes it could be difficult to read the data as intended.

To read or write data from/on the optical tape 1, the light beam always needs to maintain a predetermined converging state on a target track. For that purpose, "focus control" and a "tracking control" need to be done. The "focus control" means controlling the position of an objective lens along a normal to the surface (i.e., storage plane) of the optical tape 1 so that the focal point (or at least the converging point) of the light beam is always located on the target track. On the other hand, the "tracking control" means controlling the position of the objective lens parallel to the storage plane of the optical tape 1 and perpendicularly to the track so that the light beam spot is always located right on the target track.

In order to perform such a focus control or a tracking control, the focus error or the tracking error needs to be detected based on the light that has been reflected from the optical tape 1 and the position of the light beam spot needs to be adjusted so as to reduce the error as much as possible. The magnitudes of the focus error and the tracking error are respectively represented by a "focus error (FE) signal" and a "tracking error (TE) signal", both of which are generated based on the light that has been reflected from the optical tape 1.

Figure 2A:
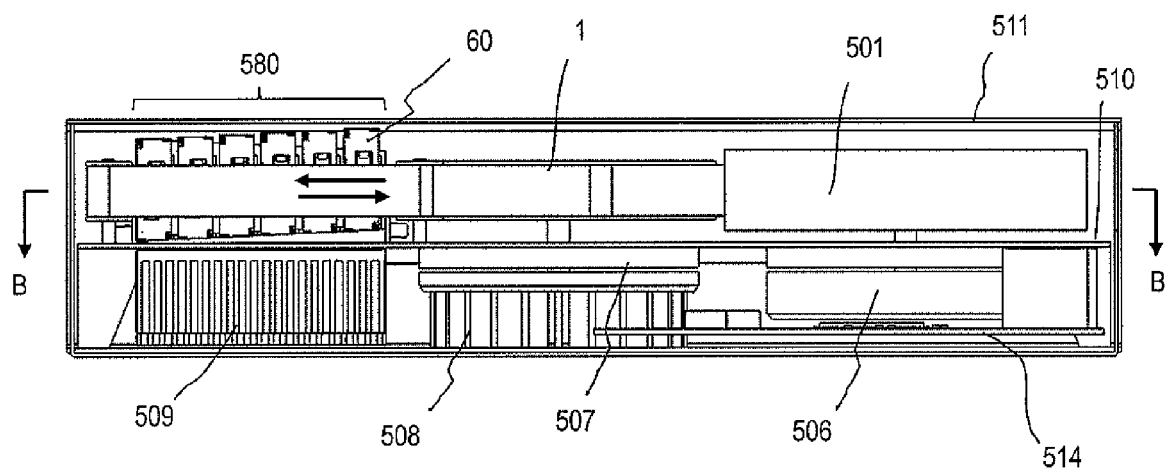
FIG. 2A illustrates an exemplary arrangement for an optical data streamer apparatus as an embodiment of the present disclosure.
Figure 2B:
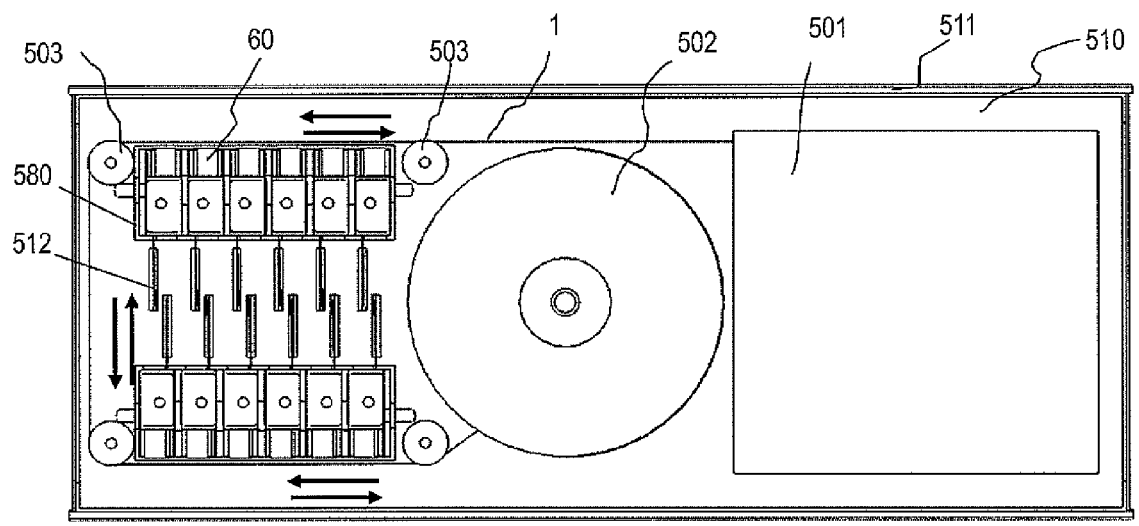
FIG. 2B is a cross-sectional view of the apparatus as viewed on the plane B-B shown in FIG. 2A.

FIG. 2A illustrates an exemplary arrangement for an optical data streamer apparatus as an embodiment of the present disclosure, and FIG. 2B is a cross-sectional view of the apparatus as viewed on the plane B-B shown in FIG. 2A. In the embodiment illustrated in FIG. 2A, the upside corresponds to perpendicularly upside, and the downside corresponds to perpendicularly downside. Thus, FIG. 2B illustrates an exemplary internal arrangement of this optical data streamer apparatus as viewed from right over the apparatus.

FIGS. 2A and 2B illustrate a situation where the apparatus is loaded with a tape cartridge 501 in which the optical tape 1 is housed. The tape cartridge 501 is readily attachable and removable to/from the apparatus. And the optical data streamer apparatus shown in FIGS. 2A and 2B is loaded with a selected one of multiple tape cartridges 501 that have the same shape.

The optical data streamer apparatus of this embodiment includes a housing 511, a chassis 510 that is arranged inside of the housing 511, a plurality of pickup parts 60 that are arranged so as to write data on the optical tape 1, and a radiator 509. Those pickup parts 60 are positioned by a positioning mechanism provided for an optical pickup assembly 580.

More specifically, this optical data streamer apparatus includes motors 506 and 507 that make the optical tape 1 run, guide posts 503 and a winding spool 502. The motor 507 is mechanically interlocked with the winding spool 502 and turns the winding spool 502. On the other hand, the motor 506 is mechanically interlocked with the shaft of the tape cartridge 501 loaded and operates so as to wind the tape 1, which has been pulled out of the tape cartridge 501, back to the tape cartridge 501. Using these two motors 506 and 507, the tape 1 can run in both of the two directions that are indicated by the arrows.

The optical pickup assembly 580 includes a number of pickup parts 60, which are arranged in the direction in which the optical tape 1 runs. The optical pickup assembly 580 of this embodiment has upper and lower arrays of pickup parts 60. In the housing 511, arranged is a blower fan 508 that is mechanically coupled to the motor 507. That is why as the motor 507 turns, the blower fan 508 turns, too.

Each pickup part 60 has a single or multiple optical pickups. The configuration of each optical pickup will be described in detail later. The pickup parts 60 are connected to flexible printed circuit boards (FPCs) 512 for optical pickups. This optical data streamer apparatus further includes a circuit board (not shown) that is connected to the flexible printed circuit boards 512 and that includes circuit components that control the pickup parts 60 and the motors 506 and 507. Optionally, the pickup parts 60 and a circuit that would normally be mounted on another circuit board could be partially arranged on the flexible printed circuit boards 112.

Hereinafter, an exemplary circuit configuration for an optical data streamer apparatus according to this embodiment will be described with reference to FIG. 3.

Figure 3:
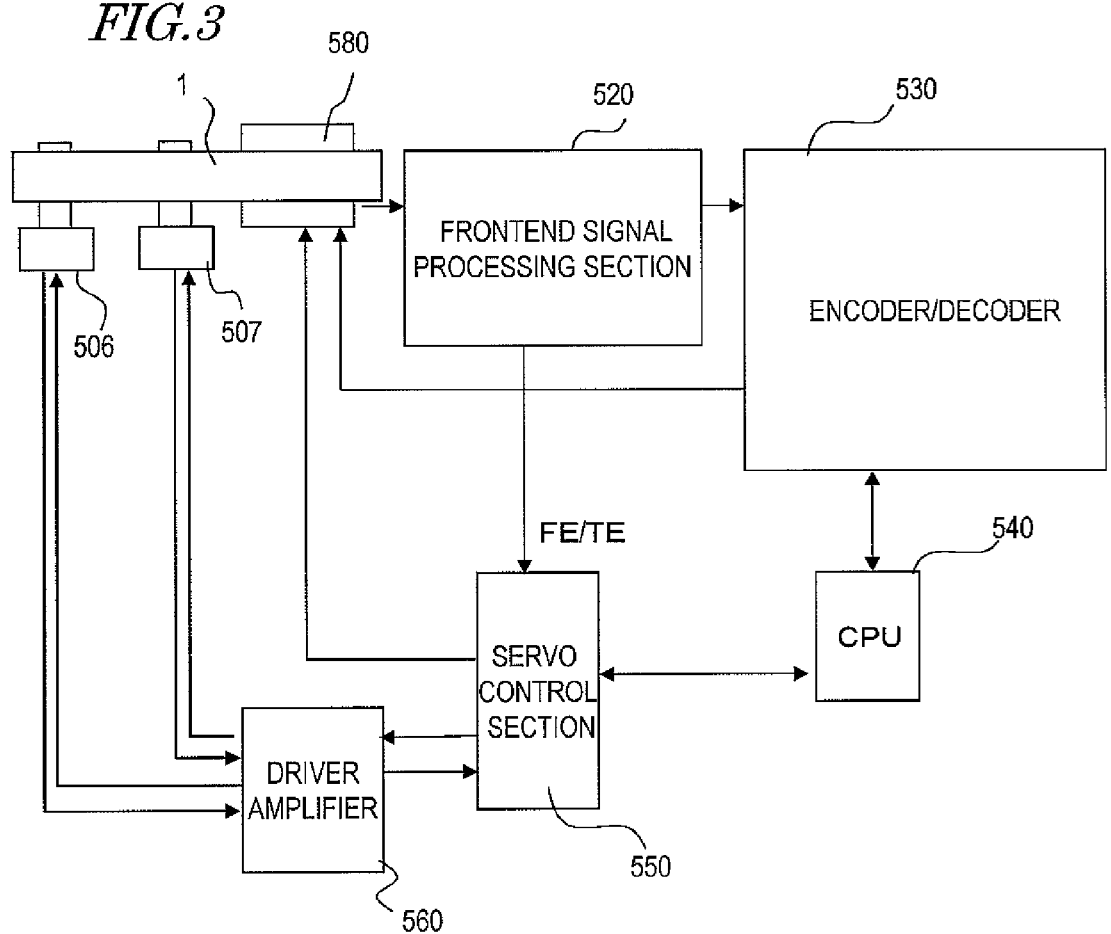
FIG. 3 illustrates an exemplary circuit configuration for an optical data streamer apparatus according to an embodiment of the present disclosure.

The optical data streamer apparatus illustrated in FIG. 3 includes circuit blocks that are electrically connected to the optical pickup assembly 580 and motors 506 and 507.

In the exemplary configuration shown in FIG. 3, the output of the optical pickup assembly 580 is supplied to an encoder/decoder 530 by way of a frontend signal processing section 520. In reading data, the encoder/decoder 530 decodes the data that is stored on the optical tape 1 based on the signal that has been generated by the optical pickup assembly 580. In writing data, on the other hand, the encoder/decoder 530 encodes the data to generate a signal to be written on the optical tape 1 and outputs the signal to the optical pickup assembly 580.

The frontend signal processing section 520 generates a read signal based on the output of the optical pickup assembly 580, and also generates a focus error signal FE and a tracking error signal TE. The focus error signal FE and the tracking error signal TE are then supplied to a servo control section 550. In response, the servo control section 550 gets the motors 506 and 507 controlled by a driver amplifier 560. The servo control section 550 also gets the position of an objective lens controlled by a lens actuator in the optical pickup assembly 580. The encoder/decoder 530, the servo control section 550 and all the other components are controlled by a CPU 540. The blocks illustrated in FIG. 3 can be implemented by assembling together integrated circuit elements, memories and other electronic parts on a circuit board.

The storage plane of the optical tape 1 that can be used in this embodiment may have a width of about 10 mm, for example. In that case, data can be read and written from/on the running optical tape 1 over the entire width of the storage plane thereof by twelve optical pickups, for example.

Before the tape cartridge 501 is loaded into this optical data streamer apparatus, the optical tape 1 housed in the tape cartridge 501 has been wound around a spool (not shown). And when the tape cartridge 501 is loaded into the optical data streamer apparatus, the optical tape 1 is pulled out while being guided by a number of tape guide posts 503 and then wound around the winding spool 502. Each of the pickup parts 60 is fixed at a predetermined position with respect to the optical tape 1 so as to read and write information from/on the optical tape 1. It should be noted that as long as multiple optical pickups are provided for a single optical data streamer apparatus, the number of the optical pickups provided does not have to be, and may be greater or smaller than, twelve.

The feed motor 507 drives and turns the winding spool 502, thereby running the optical tape 1 in the forward direction. At the same time, the feed motor 507 also drives the blower fan 508. On the other hand, the reverse motor 506 drives and turns a spool (not shown) in the tape cartridge 501, thereby running the optical tape 1 in the reverse direction. In the meantime, as the winding spool 502 is also driven by the optical tape 1, the blower fan 508 is turned, too. As the pickup parts 60 are thermally coupled to the radiator 509, the heat generated by the pickup parts 60 is transferred to the radiator 509.

During reading or writing, the optical tape 1 is run either in the forward direction by the feed motor 507 or in the reverse direction by the reverse motor 506, while those optical pickups can perform a read/write operation on the optical tape 1 at the same time.

Hereinafter, it will be described how those optical pickups operate according to this embodiment.

Figure 4A:
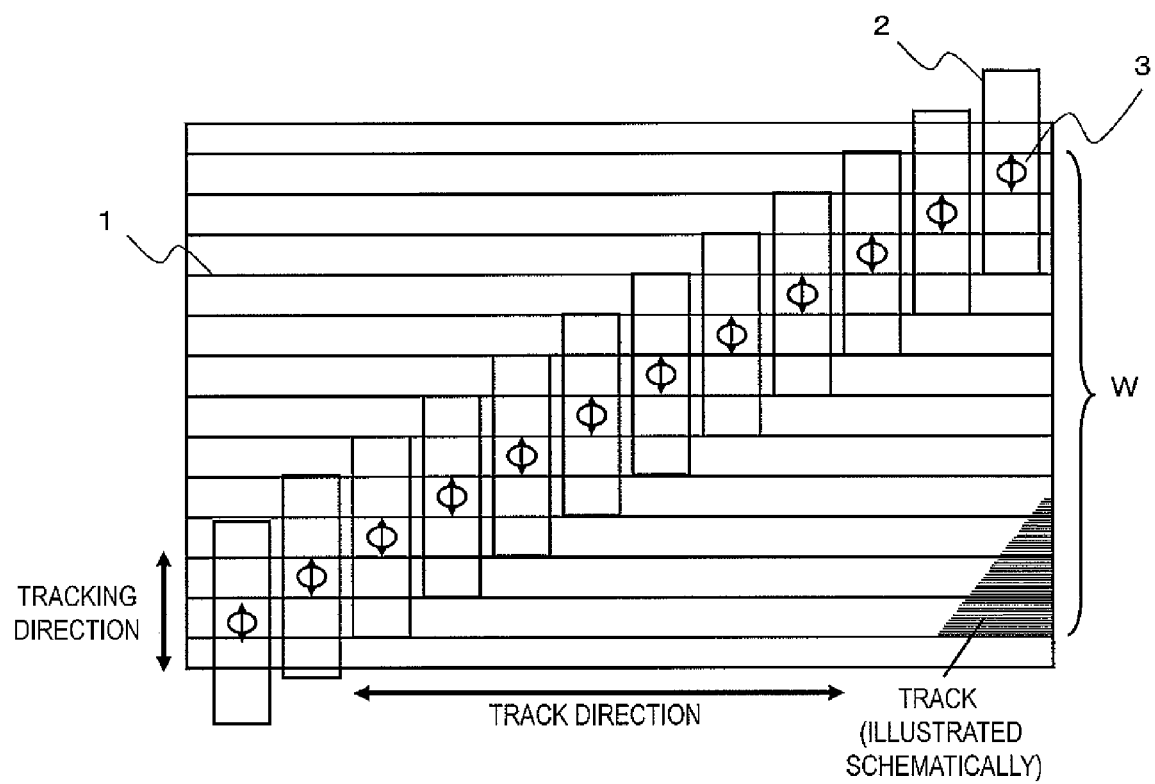
FIG. 4A is a plan view illustrating an exemplary arrangement of optical pickups 2 according to a first embodiment of the present disclosure.

FIG. 4A is a plan view schematically illustrating a configuration for an optical read/write apparatus with multiple optical pickups according to this embodiment.

As shown in FIG. 4A, in this embodiment, twelve optical pickups 2 are arranged with respect to the given optical tape 1. In this example, those twelve optical pickups 2 are arranged in line obliquely to the track direction. As described above, the optical tape 1 has a lot of tracks that are arranged within the range with the width W and runs in the track direction. Only a part of the optical tape 1 is illustrated in FIG. 4A for the sake of simplicity.

That range of the optical tape 1 with the width W is covered by these twelve optical pickups 2. That is to say, each of these optical pickups 2 can read and write data from/on tracks that are located within the range with a width of W/12.

Figure 4B:
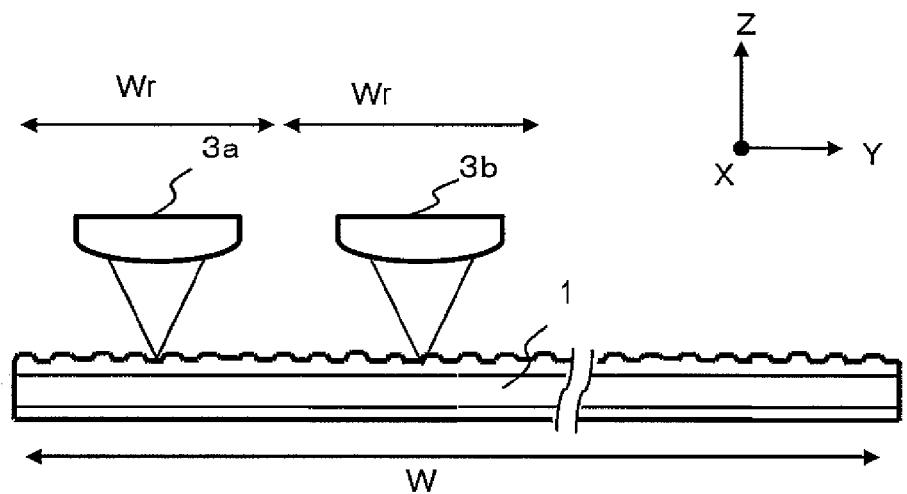
FIG. 4B is a cross-sectional view schematically illustrating the objective lenses 3a and 3b that two adjacent optical pickups have.
Figure 4C:
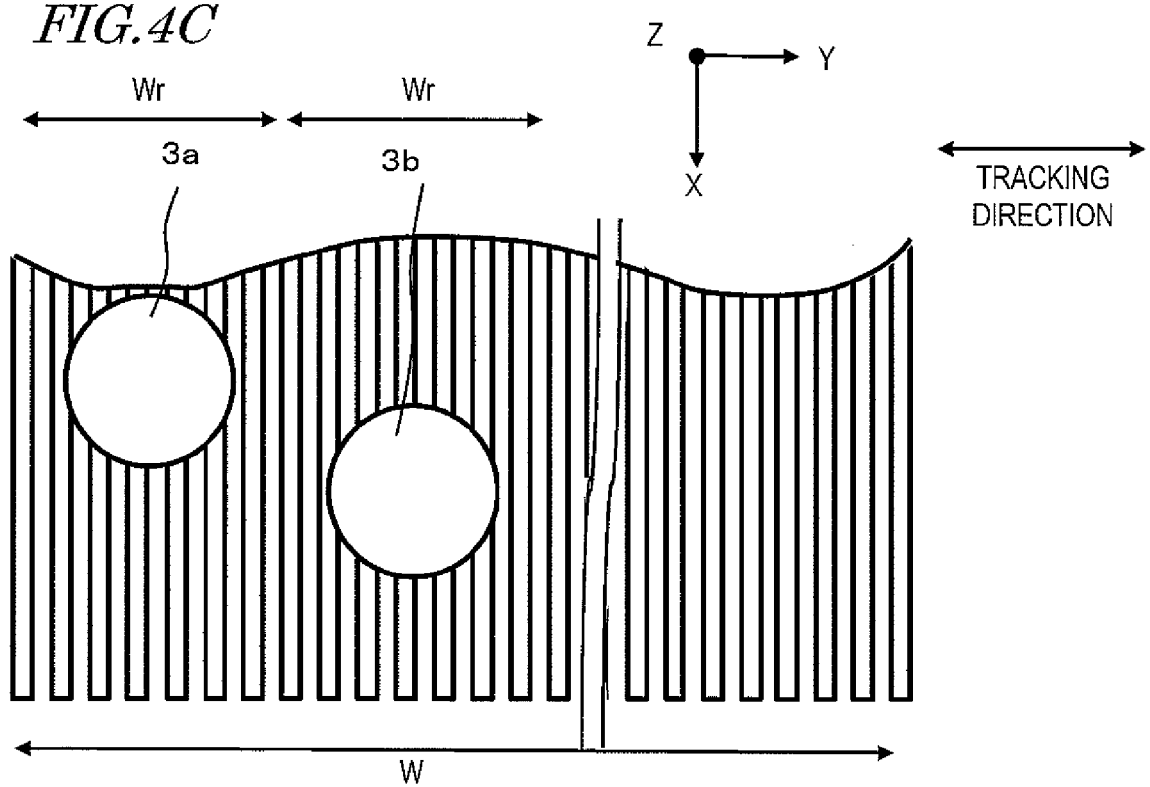
FIG. 4C is a plan view schematically illustrating an exemplary arrangement of those objective lenses 3a and 3b with respect to the surface of the optical tape.

FIG. 4B is a cross-sectional view schematically illustrating the objective lenses 3a and 3b that two adjacent optical pickups 2 have, and FIG. 4C is a plan view schematically illustrating an exemplary arrangement of those objective lenses 3a and 3b with respect to the surface of the optical tape 1. The positions of these objective lenses 3a and 3b are changed in the focusing direction (i.e., in the Z direction) and in the tracking direction (i.e., in the Y direction) by their lens actuator. The maximum movable range of the objective lenses 3a and 3b in the tracking direction (i.e., in the Y direction) is defined by the width Wr. If the objective lens 3 of each optical pickup 2 can move up to about 1 mm in the tracking direction, then every track can be covered efficiently by arranging approximately ten or more optical pickups 2 with respect to an optical tape 1 with a width W of 10 mm.

Although not shown in FIGS. 4A, 4B and 4C, the optical pickups 2 actually have lens actuators to change the positions and orientations of the objective lenses 3a and 3b. That is why if a lot of objective lenses 3 are arranged in line in the width direction of the optical tape 1 (i.e., in the Y direction), the maximum movable range of each objective lens 3 in the tracking direction (i.e., in the Y direction) may be restricted by the structure of its lens actuator. That is why to cover every track, a number of optical pickups 2 may be arranged in the track direction (i.e., in the X direction) so as to shift from one optical pickup to another as shown in FIGS. 4A.

FIG. 5 is a plan view illustrating how two 2a and 2b out of the twelve optical pickups 2 shown in FIG. 4A make a lens shift. These two optical pickups 2a and 2b shown in FIG. 5 will be referred to herein as a "first optical pickup 2a" and a "second optical pickup 2b", respectively. The first optical pickup 2a has a first objective lens 3a and the second optical pickup 2b has a second objective lens 3b.

The optical read/write apparatus of this embodiment can actually read and write data from/on a single optical tape 1 in parallel using more than two optical pickups 2 simultaneously. In the following description, however, attention will be paid to only these two 2a and 2b selected from those optical pickups 2 for the sake of simplicity. These two optical pickups 2a and 2b may or may not be adjacent to each other.

Each of these objective lenses 3a and 3b is attached to a lens actuator, which has a voice coil arrangement including a coil and a magnet and which generates driving force to shift the objective lens 3a, 3b by making current flow through its coil in this embodiment, too. A servo controller built in this optical read/write apparatus can control driving the lens actuator. That is to say, the servo controller can control the amount of drive current to supply to the coil.

If the drive current supplied to the coil of its lens actuator is set to be zero, the objective lens 3a, 3b is held at a neutral position by an elastic wire, a flat spring, a magnetic spring or any other appropriate member.

When drive current is supplied to the coil of its lens actuator, the objective lens 3a moves from the neutral position in the tracking direction within its allocated track range 4a. In the same way, when drive current is supplied to the coil of its lens actuator, the objective lens 3b also moves from the neutral position in the tracking direction within its allocated track range 4b.

If the recordable area of the optical tape 1 has a width of 10 mm and if twelve optical pickups 2 are arranged within that width, the allocated track ranges 4a and 4b may each have a width of approximately 0.83 mm (=10 mm/12). In this embodiment, when supported at their neutral position under no external force so as to readily move freely, the objective lens 3a, 3b is arranged at the middle position of their allocated track range 4a, 4b. It should be noted that the neutral position of the objective lens does not always have to be set at the middle of its allocated track range.

According to this embodiment, by controlling the amount of drive current supplied to the coil of its lens actuator, the objective lens 3a begins its read/write operation with a track that is located around the middle position of its allocated track range 4a and then sequentially makes lens shifts toward a track that is located at the end of its allocated track range 4a. On the other hand, the objective lens 3b begins its read/write operation with a track that is located around an end of its allocated track range 4b as indicated by the solid circle in FIG. 5. After that, the objective lens 3b sequentially makes lens shifts toward a track that is located at the middle of its allocated track range. That is to say, although the objective lens 3a has an initial lens shift of zero and then makes gradually increasing lens shifts, the objective lens 3b has a maximum initial lens shift and than makes gradually decreasing lens shifts. That is to say, according to this embodiment, the lens actuators are operated so that as the magnitude of shift of the first objective lens 3a increases, that of the second objective lens 3b decreases. Such an operation of the lens actuator can be controlled by the servo control section 550 shown in FIG. 3, for example.

Generally speaking, the greater the lens shift, the greater the external force to be applied to maintain that significant lens shift from the neutral position. That is why the lens actuator that generates such external force needs to dissipate increasing power. For that reason, when both of the objective lenses 3a and 3b are scanning tracks that are located around an end of their allocated track ranges 4a and 4b simultaneously as is often seen in a known apparatus, the sum of the powers dissipated by the two actuators becomes maximum, the quantity of heat generated increases significantly, and the temperature inside the apparatus rises considerably. This is not a favorable state.

According to this embodiment, when multiple optical pickups are performing read/write operations simultaneously, the lens shifts made by those optical pickups can have their phases shifted from each other. Portion (a) of FIG. 6 schematically shows how the power dissipated by the first optical pickup 2a changes with time. In FIG. 6, the abscissa represents the time and the ordinate represents the power dissipation. The first optical pickup 2a starts its read/write operation at the neutral position and comes to have an increasing magnitude of lens shift as the focus position of the light beam shifts from one target track to an adjacent one. On the other hand, portion (b) of FIG. 6 schematically shows how the power dissipated by the second optical pickup 2b changes with time. The second optical pickup 2b starts its read/write operation at a position where the magnitude of lens shift becomes maximum, not at the neutral position. Consequently, the second optical pickup 2b has the maximum magnitude of lens shift first, and then the magnitude of its lens shift decreases after that. Portion (c) of FIG. 6 is a graph showing how the sum of the powers dissipated by the first and second optical pickups 2a and 2b changes with time. Since the two optical pickups 2a and 2b dissipate the maximum power at mutually different points in time, the sum of the power dissipations can have a reduced maximum value. As can be seen, according to this embodiment, the sum of the powers dissipated by those lens actuators and the sum of the quantities of heat generated by them can be averaged, and have their variations reduced, and therefore, a rise in temperature inside the apparatus can be minimized, too.

In this embodiment, after having scanned the tracks from around the middle through the upper end of its allocated track range 4a, the objective lens 3a shown in FIG. 5 moves to around the lower end of its allocated track range 4a at a time. In the meantime, the objective lens 3b is held around the middle of its allocated track range 4b and does not have to move to any other position.

After that, the objective lens 3a begins a read/write operation with a track that is located around the lower end of its allocated track range 4a and then sequentially makes lens shifts toward a track that is located around the middle. Meanwhile, the objective lens 3b begins a read/write operation with a track that is located around the middle of its allocated track range 4b and then sequentially makes lens shifts toward a track that is located around the lower end.

Even while these operations are being performed, as the magnitude of lens shift of the objective lens 3b increases, that of the objective lens 3a decreases. As a result, the effects that have already been described with reference to FIG. 6 are achieved. It should be noted that these lens shifts do not always have to be made as in the example described above.

It should be noted that the operations described above do not always have to be performed by every two optical pickups. For example, if read/write operations are carried out in parallel using twelve optical pickups, a half (i.e., six) of those optical pickups may start their read/write operations at around the middle position while the other half may begin their read/write operations at around the lower end. Then, the sum of the powers dissipated by those twelve optical pickups and the sum of the quantities of heat generated by them can be averaged and the rise in temperature inside the optical read/write apparatus can be reduced. On top of that, if the twelve optical pickups are arranged so that two adjacent optical pickups (or objective lenses) perform read/write operation on two different locations on the same optical tape, the points of heat generation in the apparatus can also be distributed more uniformly.

Speaking more generally, if an optical read/write apparatus has K optical pickups (where K is an integer that is equal to or greater than three), including the first and second optical pickups 2a and 2b, the control section of the optical read/write apparatus may operate the lens actuators in the K optical pickups so that the sum of the magnitudes of shift of the respective objective lenses in those K optical pickups becomes either constant or substantially constant to say the least. It should be noted that if the sum of the powers dissipated by all of those optical pickups is less than the upper limit that that optical read/write apparatus tolerates, the sum of the magnitudes of shift of the objective lenses does not have to be constant.

In the example described above, the read/write operations are supposed to be started at around the middle position and at around an end position for the sake of simplicity. However, the read/write operations do not always have to be started at these two positions. Rather the same effect can also be achieved as long as the sum of the magnitudes of shift of the respective objective lenses while multiple optical pickups are performing read/write operations is substantially constant. Thus, those optical pickups do not have to start their read/write operations at that particular combination of positions but may start them at any of various other combinations of positions.

Also, if those optical pickups have mutually different read/write operation starting positions, then the objective lens of each optical pickup may be shifted in advance according to its read/write operation starting position during the startup process of the optical read/write apparatus. To shift each objective lens to a predetermined position during the startup process will be referred to herein as "presetting". By doing presetting, the read/write operation can be started quickly.

And by getting that presetting done within the startup area of a given optical storage medium, the startup process can be finished in a shorter time. In this description, the "startup area" refers herein to an area in which initial settings, including offset correction on the overall apparatus and light intensity adjustment on the optical pickups, are done during the startup process before the apparatus starts reading or writing user data. Such a startup area may be provided for at least one of the front and rear ends of the recording tracks on an optical tape. If the optical storage medium is a disc, on the other hand, the startup area may be provided for at least one of the innermost and outermost areas. In the startup area of an optical storage medium, various kinds of management information can be stored. For example, the magnitude of initial lens shift allocated to each optical pickup or information for use to determine the magnitude of each lens shift is stored in advance in the startup area of an optical storage medium.

In the embodiment described above, the multiple optical pickups 2 perform read/write operations simultaneously while being substantially fixed in a direction that intersects with the recording tracks of the optical tape 1 at right angles. And the sum of the magnitudes of lens shifts of those optical pickups 2 is always substantially constant. Optionally, however, some of those optical pickups 2 may perform write operations and the other optical pickups 2 may perform read operations. When such operations are carried out, the sum of the magnitudes of lens shift of those optical pickups 2 may be set to be always substantially constant.

Embodiment 2

Hereinafter, an optical read/write apparatus as a second embodiment of the present disclosure will be described.

FIG. 7A illustrates an exemplary arrangement of optical pickups according to this embodiment. In this embodiment, two optical pickups are housed in the same housing.

In this embodiment, two objective lenses 3a and 3b are both attached to the same pickup part 60, which is a major difference from the first embodiment described above.

FIG. 7B is perspective view illustrating a configuration for each pickup part 60 according to this embodiment. In this example, two optical pickups 2 are combined with each other, and this pickup part 60 includes an optical base 20 and two lens actuators 9a and 9b that are fixed on the upper surface of that optical base 20. In other words, in the example illustrated in FIG. 7B, two optical pickups 2 that can drive two objective lenses 3a and 3b independently of each other are integrated together. In FIG. 7B, the edges of the optical tape 1 are indicated by the dotted lines.

In this embodiment, the objective lens 3a also begins its read/write operation with a track that is located around the middle position of its allocated track range 4a and then sequentially makes lens shifts toward a track that is located at the end of its allocated track range 4a. On the other hand, the objective lens 3b begins its read/write operation with a track that is located around the upper end of its allocated track range 4b as indicated by the solid circle (which indicates the position of the objective lens 3b) in FIG. 7A. After that, the objective lens 3b sequentially makes lens shifts toward a track that is located at the middle of its allocated track range.

In this embodiment, after having scanned the tracks from around the middle through the upper end of its allocated track range 4a, the objective lens 3a moves to around the lower end of its allocated track range 4a at a time. In the meantime, the objective lens 3b is held around the middle of its allocated track range 4b and does not have to move to any other position.

After that, the objective lens 3a begins a read/write operation with a track that is located around the lower end of its allocated track range 4a and then sequentially makes lens shifts toward a track that is located around the middle. Meanwhile, the objective lens 3b begins a read/write operation with a track that is located around the middle of its allocated track range 4b and then sequentially makes lens shifts toward a track that is located around the lower end. It should be noted that the lens shifts do not always have to be made as described above.

In the other respects, this second embodiment has the same configuration and functions as the first embodiment described above. Thus, as in the first embodiment, the sum of the powers dissipated by the actuators and the sum of the quantities of heat generated by them can also be averaged and their variations can be reduced, too.

Although only one optical pickup part 60 is illustrated in FIG. 7A, a number of such optical pickup parts 60, each having two objective lenses, may naturally be arranged as in the first embodiment. Even so, if the sum of the magnitudes of shifts of those objective lenses is substantially constant during every read/write operation, the same effect can also be achieved. On top of that, if two adjacent ones of those optical pickups 2 start their read/write operations at mutually different positions, the quantity of heat generated by the entire apparatus can naturally be distributed more uniformly.

Embodiment 3

Hereinafter, an optical read/write apparatus as a third embodiment of the present disclosure will be described.

FIGS. 8A and 8B illustrate exemplary arrangements of optical pickups according to this embodiment. Specifically, two groups 5a and 5b of optical pickups are illustrated in FIGS. 8A and 8B, respectively. These two groups 5a and 5b of optical pickups are located in two different ranges but are actually the same group of optical pickups.

In this example, six optical pickups 2, each having a tracking range width Wr, are supposed to be arranged with respect to an optical tape 1 with the overall track range width W. The sum of the ranges on which these six optical pickups can perform read/write operations is calculated by 6×Wr=W/2, i.e., a half of the overall track range width W of the optical tape 1.

In the state illustrated in FIG. 8A, the objective lenses 3 of two adjacent optical pickups 2 are arranged every other allocated track range Wr, and six optical pickups 2 with such an arrangement form one group 5a of optical pickups.

Furthermore, if read/write operations need to be performed on the track ranges with no optical pickups in such a state, then the group 5a of optical pickups may be shifted in its entirety with respect to the optical tape 1 as shown in FIG. 8B so that the optical pickups form the group 5b of optical pickups. Then, the read/write operations can also get done on those track ranges.

In this embodiment, the optical pickups 2 need to be arranged with respect to the optical tape 1 as one of these two groups 5a and 5b of optical pickups. That is why if some mechanism for transporting the optical pickups 2 with a linear motor or a feed screw arrangement is used, the positions of the optical pickups can be changed easily.

As in the first and second embodiments of the present disclosure described above, if a half of the objective lenses 3 are arranged so that their lens shift increases from zero, the other half of the objective lenses 3 are also arranged according to this embodiment so that their lens shift decreases from the maximum value. In this manner, the sum of the powers dissipated by the actuators and the sum of the quantities of heat generated by them can be averaged and their variations can be reduced as well.

Although an optical read/write apparatus according to the present disclosure has been described with respect to first, second and third embodiments thereof, it will be apparent to those skilled in the art that the disclosed disclosure may be modified in numerous ways and may assume many embodiments other than those specifically described above. Accordingly, it is intended by the appended claims to cover all modifications of the disclosure that fall within the true spirit and scope of the disclosure.

An optical read/write apparatus according to the present disclosure can be used particularly effectively to cut down the power dissipated, and the quantity of heat generated, by a data storage system that is designed to read and write a huge size of data in parallel using a number of optical pickups simultaneously.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2011-210371 filed Sep. 27, 2011 and No. 2012-100826 filed Apr. 26, 2012, the entire contents of which are hereby incorporated by reference.

What is claimed is:

1. An optical read/write apparatus comprising:
    a plurality of optical pickups, including a first optical pickup and a second optical pickup, which are arranged so as to irradiate mutually different tracks of an optical storage medium with a light beam; and
    a control section which controls those optical pickups,
    wherein the first optical pickup includes a first light source, a first objective lens that condenses a light beam that has been emitted from the first light source onto the optical storage medium, and a first lens actuator that is able to shift the first objective lens in a track crossing section with respect to a middle position, and
    wherein the second optical pickup includes a second light source, a second objective lens that condenses a light beam that has been emitted from the second light source onto the optical storage medium, and a second lens actuator that is able to shift the second objective lens in the track crossing section with respect to the middle position, and
    wherein the control section makes the first and second lens actuators operate so that as the magnitude of shift of the first objective lens increases in the first optical pickup, the magnitude of shift of the second objective lens decreases in the second optical pickup.

2. The optical read/write apparatus of claim 1, wherein the respective positions of the plurality of optical pickups are fixed perpendicularly to a track direction of the optical storage medium.

3. The optical read/write apparatus of claim 1, wherein the control section makes the first and second lens actuators operate so that the sum of the respective magnitudes of shift of the first and second objective lenses in the first and second optical pickups becomes constant.

4. The optical read/write apparatus of claim 1, wherein the number of the optical pickups arranged, including the first and second optical pickups, is K, which is an integer that is equal to or greater than three, and wherein each said optical pickup includes a light source, an objective lens that condenses a light beam that has been emitted from the light source onto the optical storage medium, and a lens actuator that is able to shift the objective lens in the track crossing section with respect to the middle position, and wherein the control section makes the lens actuators operate in the K optical pickups so as to make constant the sum of the respective magnitudes of shift of the objective lenses in the K optical pickups.

5. The optical read/write apparatus of claim 1, wherein the control section controls the first and second optical pickups so that the first optical pickup starts performing a read/write operation at around the middle of its allocated track range and that the second optical pickup starts performing a read/write operation at one end of its allocated track range.

6. The optical read/write apparatus of claim 1, wherein the first and second optical pickups are housed in the same housing.

7. The optical read/write apparatus of claim 1, wherein the control section arranges the respective objective lenses at their initial positions, which are associated with respective positions on tracks where the optical pickups start performing read/write operations, during a startup process.

8. The optical read/write apparatus of claim 1, wherein the control section changes the relative positions of the optical pickups with respect to the optical storage medium so that the neutral position of the objective lens of each said optical pickup is substantially on the centerline of its allocated track range.

9. The optical read/write apparatus of claim 7, wherein the control section determines, by reference to information that has been stored in advance in a startup area of the optical storage medium, the initial positions of the objective lenses when read/write operations are started.

10. The optical read/write apparatus of claim 9, wherein the optical storage medium is an optical tape, and wherein the startup area is provided for at least one of the two ends of the optical tape.

* * * * *